United States Patent Office 3,564,519
Patented Feb. 16, 1971

3,564,519

SEMI-PERMANENT MAGNETIC MEMORY ELEMENT AND A MEMORY MATRIX USING THEM

Shintaro Oshima, 28–7, 2-chome, Higashi-machi, Kichijoji, Musashino-shi, Tokyo-to, Japan; Yukio Nakagome, 1, 2-chome Nakamura, Nerima-ku, Tokyo-to, Japan; Tetsusaburo Kamibayashi, 130 Nobidome, Shinzamachi, Kitaadachi-gun, Saitama-ken, Japan; and Kitsutaro Amano, 4072–6 Kamitsuruma, Sagamihara-shi, Kanagawa-ken, Japan Continuation of application Ser. No. 530,235, Feb. 25, 1966. This application Dec. 29, 1969, Ser. No. 888,148
Claims priority, application Japan, Feb. 27, 1965, 40/11,003; Mar. 8, 1965, 40/13,053; May 26, 1965, 40/30,780
Int. Cl. G11c *5/02, 11/14, 17/00*
U.S. Cl. 340—174 7 Claims

ABSTRACT OF THE DISCLOSURE

A memory element comprising a ferromagnetic film, a first conductor coupled with the ferromagnetic film, a second conductor arranged orthogonally to the first conductor and coupled with the ferromagnetic film, means for establishing a rest direction of magnetization the film in either of two different directions which correspond to binary information to be stored, and means for applying a drive signal to the first conductor. The direction of residual magnetism of the film is established on a predetermined line lying in the film and substantially in parallel with the first conductor, and said two different directions are substantially in parallel with either of the conductors, whereby an output signal having either of two opposite polarities determined in accordance with the binary information can be non-destructively read out from the second conductor when the first conductor is energized by the drive signal. A memory matrix in which memory cells of only a partial zone of the matrix are semi-permanently fixed by employing the above-mentioned memory elements in the partial zone.

This application is a continuation of our U.S. application, Ser. No. 530,235, filed Feb. 25, 1966 and now abandoned.

This invention relates to semi-permanent magnetic memory elements and memory matrixes using them.

In a conventional semi-permanent memory system, for example, a "twistor," the magnetic substance of each memory cell in which binary information "0" is to be stored is magnetically saturated by an external magnetic field generated by a small bar magnet. That is, the existence or non-existence of the small bar magnet corresponds to, respectively, binary information "1" or "0," whereby, when a drive signal is applied to read out the memorized binary information, a read-out signal is generated with respect to a binary information "1" only and is not generated with respect to a binary information "0." Accordingly, it is considerably difficult to detect the read-out binary information "1" and "0" under a disturbance, such as noise. Moreover, all memory cells of the semi-permanent "twistor"-memory matrix are necessarily fixed by semi-permanently fixing either binary information with respect to partial zones of the matrix because the stored binary information corresponds respectively to saturation and non-saturation of the magnetic substance.

An object of this invention is to provide a semi-permanent magnetic memory element in which the read-out output signal has either of opposite polarities in accordance with the stored binary information.

Another object of this invention is to provide a semi-permanent magnetic memory matrix in which memory cells of partial zones only can be semi-permanently fixed.

Said object and other objects and advantages of the present invention have been attained by a magnetic semi-permanent memory element and a magnetic semi-permanent memory matrix each according to this invention.

According to the invention there is provided a memory element comprising a ferromagnetic film, a first conductor coupled with the ferromagnetic film, a second conductor arranged orthogonally to the first conductor and coupled with the ferromagnetic film, means for establishing a rest direction of magnetization of each memory cell in either of two different directions which correspond to binary information to be memorized, means for applying a drive signal to the first conductor, characterized in that the direction of residual magnetism of the film is established on a predetermined line lying in the film, said line being substantially in parallel with the first conductor, and said two different directions are substantially in parallel with either of the conductors, whereby an output signal having either of two opposite polarities in accordance with the binary information can be non-destructively read out from the second conductor when the first conductor is energized by the drive signal.

According to the invention there is further provided a memory matrix comprising a plurality of memory cells of ferromagnetic film arranged in a matrix form, a set of first conductors coupled with respective rows of memory cells, a set of second conductors arranged orthogonally to the first conductors and coupled with respective columns of conductors, means of establishing a rest direction of magnetization of each memory cell in either of two different directions which correspond to binary information to be memorized, means for applying a binary information signal to at least one of the second conductors, and means for applying a drive signal to at least one of the first conductors, characterized in that the direction of residual magnetism of the film is established along a predetermined line lying in the film, said line being substantially in parallel with the first conductor, and each of said memory cells arranged in a partial zone only of the matrix has a rest direction which is semi-permanently fixed and substantially in parallel with either of the first or second conductors, whereby a bit of information is semi-permanently stored in each of the memory cells of the partial zone and destructively stored in each of the memory cells of the remaining zones of the matrix when selection is achieved by energizing with the information signal and the drive signal, and a bit of stored information is read out, from at least one selected second conductor, as an output signal having either of opposite polarities in accordance with the stored binary information when selection is achieved by applying a drive signal of appropriate intensity to at least one selected first conductor.

The novel features of this invention are set forth with particularity in the appended claims, this invention, however, both as to its construction and operation together with further objects and advantages thereof, may best be understood by reference to the following description, taken in connection with the accompanying drawings, in which the same or equivalent parts are designated by the same reference characters or numerals, and in which:

Figure 1:
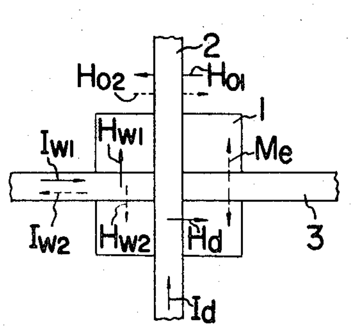
FIG. 1 is a planar view for illustrating one embodiment of the memory element of this invention.
Figure 3A:
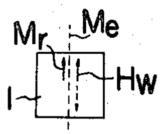
Figure 3B:
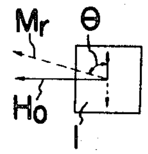
Figure 3C:
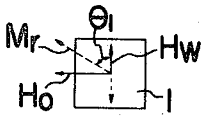
Figure 5A:
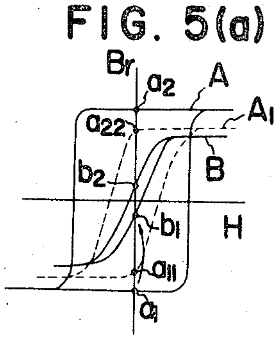
Figure 5B:
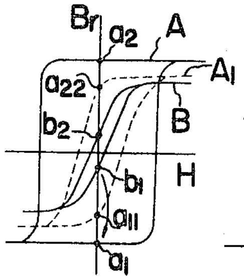
Figure 5C:
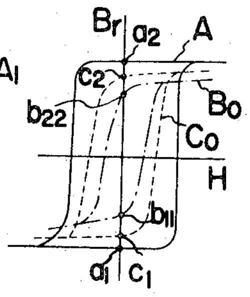
Figure 6A:
Figure 6B:
Figure 6C:
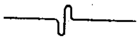
Figure 7:
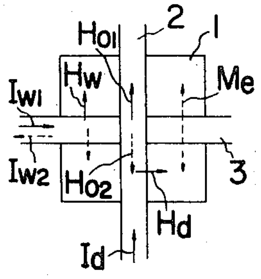
Figure 8:
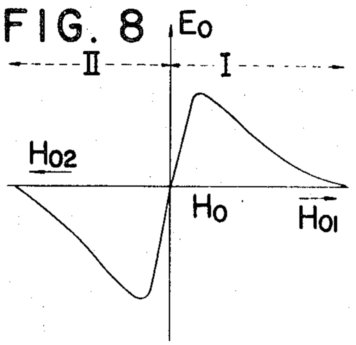
Figures 9, 10:
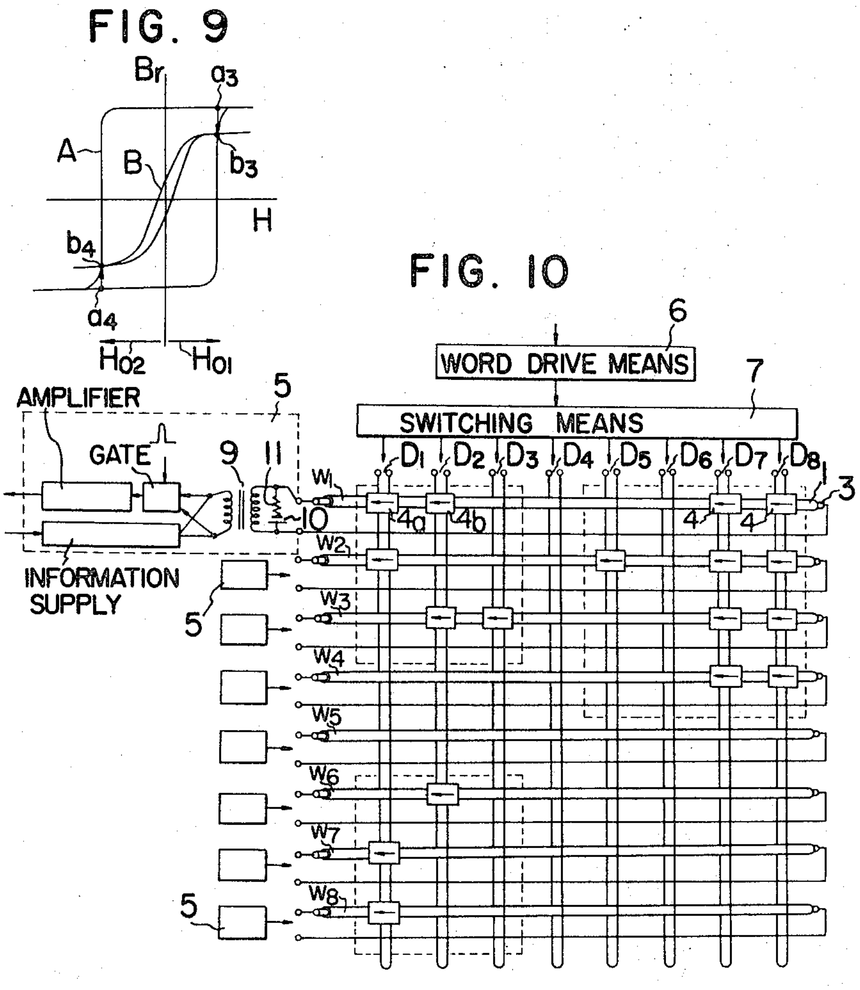
Figure 11:
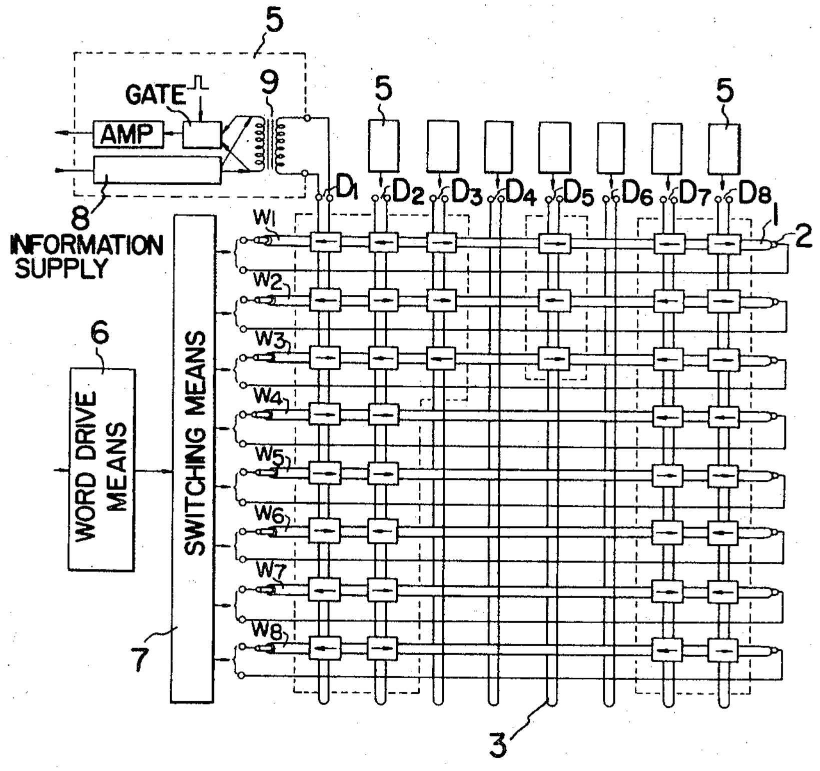
Figure 12:
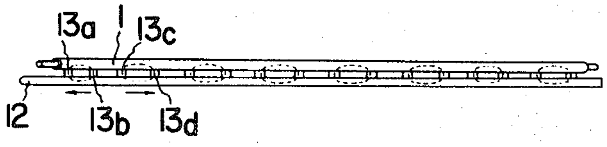

FIGS. 3(*a*), 3(*b*), 3(*c*), 4(*a*), 4(*b*) and 4(*c*) are vector diagrams for describing the operation of the memory element shown in FIG. 1;

FIGS. 5(*a*), 5(*b*) and 5(*c*) are hysteresis curves for describing the operation of the memory element shown in FIG. 1;

FIGS. 6($a$), 6($b$) and 6($c$) are waveforms of the output signal of the memory element shown in FIG. 1;

FIG. 7 is a planar view for illustrating another embodiment of the memory element of this invention;

FIG. 8 is a characteristic curve for describing the operation of the element shown in FIG. 7;

FIG. 9 are hysteresis curves for describing the operation of the element shown in FIG. 7;

FIGS. 10 and 11 are connection diagrams for illustrating embodiments of the memory matrixes of this invention; and FIG. 12 is a side view of a row magnetic wire of this invention associated with external magnets.

Referring to FIG. 1, the construction of the memory element of this invention will be first described. The memory element comprises a ferromagnetic thin film 1, a first conductor 2, a second conductor 3 and means 4 (FIG. 10) for establishing a rest direction of magnetization of the film 1 in either of two different directions which correspond respectively to binary information to be stored. The film 1 has an easy magnetization axis as shown by a dotted arrow M$e$, so that the direction of residual magnetism of the film 1 is established on a predetermined line M$e$ lying in the film 1. The first conductor 2 is arranged substantially in parallel with the easy axis M$e$ and coupled with the film 1. The second conductor 3 is arranged substantially orthogonally to the first conductor 2 and coupled with the film 1. In FIG. 1, an arrow H$d$ shows a magnetic field caused when a drive current I$d$ flows into the first conductor 2; an arrow $Hw_1$ (or $Hw_2$) shows a magnetic field caused when an information current $Iw_1$ (or $Iw_2$) flows in the second conductor 3; and an arrow $Ho_1$ (or $Ho_2$) shows an external magnetic field H$o$ for semi-permanently establishing the rest direction of magnetization of the film 1 in either of two different directions. Accordingly, the magnetic field H$o$ corresponds to said means 4 and is generated by a small magnet.

Figure 2:
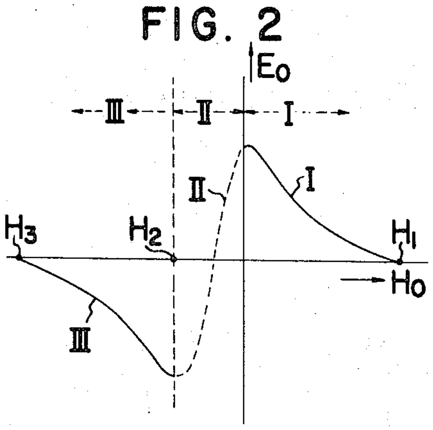
FIG. 2 is a characteristic curve for describing the operation of the element of FIG. 1.

In this embodiment, when the drive current I$d$ of a constant intensity flows into the first conductor 2, an output voltage E$o$ is induced across a load impedance interlinked with the second conductor 3 as shown in FIG. 2. The intensity and polarity of the output voltage E$o$ change in accordance with the intensity and the direction of the external magnetic field H$o$. In the case wherein the directions of the fields H$o$ and H$d$ are the same, the voltage E$o$ changes according to a curve I and reaches zero value when the intensity of the field H$o$ exceeds an intensity $H_1$ at which the film 1 is saturated. In the case wherein directions of the fields H$o$ and H$d$ are opposed to each other, the voltage E$o$ changes according to a curve II and then a curve III. When the intensity of the field H$o$ is greater than an intensity $H_3$, the output voltage E$o$ becomes zero because of saturation of the film. As is apparent from FIG. 2, when the intensity of the field H$o$ is an appropriate value $H_2$, the output voltage E$o$ has the polarity reversed to that of the output voltage E$o$ corresponding to the state where the intensity of the field H$o$ is zero.

Figure 4A:
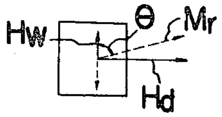
Figure 4B:
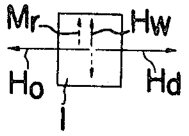
Figure 4C:
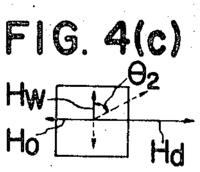

The above-mentioned operation can be described as follows with reference to FIGS. 3($a$) through 5($c$). FIG. 3($a$) shows a direct magnetic field H$w$ and a residual magnetism M$r$ in the case of no external magnetic field H$o$. When the film 1 has an inherent anisotropy the direction of which is parallel to that of the field H$w$, the residual magnetism M$r$ is directed in parallel with the axis of the inherent anisotropy. When the film 1 is isotropic, the residual magnetism is directed as shown in FIG. 3($a$) by aplying the direct magnetic field H$o$. In other words, the inherent anisotropy or the direct magnetic field H$w$ is employed for establishing the residual magnetism M$r$ on the predetermined line M$e$ lying in the film 1. By applying the drive magnetic field H$d$ to the film 1, the direction of the magnetization M$r$ is rotated by an angle $\theta$ as shown in FIG. 4($a$), so that an output voltage E$o$ is induced in the second conductor 3 by rotation of the magnetism M$r$. This operation can be also described with reference to hysteresis curves A and B shown in FIG. 5($a$), where the curves A and B correspond respectively to hysteresis curves of the film in the cases of non-existence and existence of the drive magnetic field H$d$. If it is assumed that the residual magnetism B$r$ of the film 1 is a point $a$ in the case of non-existence of the drive magnetic field H$d$, the magnetism B$r$ will be transferred from the point $a$ to a point $b$ by applying the drive field H$d$. The output voltage E$o$ induced in the second conductor 3 has positive polarity as shown in FIG. 6($a$) since the magnetism B$r$ is transferred toward its positive direction.

On the other hand, if the external magnetic field H$o$ is applied, the output voltage E$o$ of negative polarity will be induced in the second conductor 3 when the drive field H$d$ is applied. FIG. 3($b$) shows the residual magnetism M$r$ which is a resultant magnetization by the fields H$w$ and H$o$. If the intensity of the field H$o$ is equal to that of the field H$d$, the field H$d$ applied will be counterbalanced by the field H$o$ since the polarities of the fields H$d$ and H$o$ are opposed to each other. Accordingly, when the field H$d$ is applied, the magnetization M$r$ is rotated by an angle $\theta$ and directed in parallel with the direction of the field H$w$. On hysteresis curves A and B, the magnetization B$r$ is transferred from the point $b$ to the point $a$ as shown in FIG. 5($b$) when the field H$d$ is applied under the field H$o$. FIG. 6($b$) shows the output voltage E$o$ of negative polarity induced in the second conductor in this case.

In the case of application of a magnetic field H$o$ of an intensity included in a range II shown in FIG. 2, the output voltage E$o$ induced in the conductor 3 changes to negative polarity and successively to positive polarity as shown in FIG. 6($c$). The reason for such change can be described as follows. If it is assumed that the magnetization M$r$ is directed as shown in FIG. 3($c$) by the fields H$w$ and H$o$ in the absence of the drive field H$d$, the magnetization M$r$ will be rotated by an angle $(\theta_1+\theta_2)$ when a field H$d$ greater than the field H$o$ is applied. On hysteresis curves A, B$o$ and C$o$ which correspond, respectively, to conditions in FIG. 3($a$), 3($c$) and 4($c$), the residual magnetism B$r$ will be transferred from a point $b_{11}$ to a point $a_1$ and then to a point $c_1$ (FIG. 5($c$)). This is the reason why the change of the output voltage E$o$ as shown in FIG. 6($c$) occurs.

In the range I of the field H$o$, the residual magnetism B$r$ will be established at a rest point $a_{11}$ in the absence of the field H$d$ if the curve $A_1$ corresponds to a hysteresis curve in the presence of such a field H$o$. In this case, however, change of magnetic flux caused by transfer of the rest point from $a_{11}$ to $b_1$ is smaller than that from the point $a_1$ to the point $b_1$. Accordingly, the magnitude of the output voltage E$o$ is reduced along the curve I shown in FIG. 2 in accordance with increase of the positive intensity of the field H$o$. Similarly as in the range I of the field H$o$, the intensity of the output voltage E$o$ decreases along curve III shown in FIG. 2 in accordance with increase of the negative intensity of the field H$o$.

In all of the cases described above, the polarity of the output voltage E$o$ is reversed in accordance with reversal of the field H$w$ only. Since this reversal of the polarity of the output voltage E$o$ can be easily understood by reference to the above description, details of this operation are herein omitted.

Referring to FIGS. 7, 8 and 9, another memory element of this invention will be described. In the memory cell shown in FIG. 7, only the direction of the external magnetic field H$o$ differs from that of the memory cell shown in FIG 1, while the other features are respectively identical to those shown in FIG. 1. In this embodiment, the rest direction of magnetization is established in either of two opposite directions which are substantially in parallel with the first conductor 2 and correspond to binary information to be stored. FIG. 8 shows the level and polarity of the output voltage E*o* which is induced in the second conductor 3 when the drive field H*d* is applied to the film 1. This operation can be described by referring to FIG. 9. Hysteresis curves A and B correspond respectively to the hysteresis curves A and B shown in FIGS. 5(*a*) and 5(*b*). If it is assumed that the rest point of magnetization of the film 1 is established at a point $a_3$ or $a_4$ by the external magnetic field $Ho_1$ of $Ho_2$ in accordance with binary information to be stored, the rest point $a_3$ or $a_4$ will be transferred to a point $b_3$ or $b_4$ when the curve A is reduced to the curve B by application of the drive field H*d*.

By employing a plurality of memory elements as described above, a memory matrix can be formed in which memory cells of partial zones only of the matrix can be semi-permanently fixed. FIGS. 10 and 11 show embodiments of such a matrix memory according to the invention. In these embodiments, there are employed a plurality of magnetic wires ($W_1$, $W_2$, $W_3$ . . .) each of which is comprised of a diamagnetic wire, such as copper, beryllium copper or Phosphor bronze, or a paramagnetic wire, such as aluminium, coated with a ferromagnetic film, such as a Permalloy, by electric, chemical plating, or vacuum evaporative deposition.

The embodiment shown in FIG. 10 comprises a set of such magnetic wires 3 ($W_1$, $W_2$, $W_3$ . . .), a set of conductive wires 2 ($D_1$, $D_2$, $D_3$ . . .), means 4 for establishing a rest direction in each of the memory cells, means 5 for applying a binary information signal to at least one of the magnetic wires 3, and means 6, 7 for applying a drive signal to at least one of the conductors 2. The easy magnetization axis of the film on the magnetic wire 3 is established in the circumferential direction of the magnetic wire 3. The set of row magnetic wires 3 and the set of column conductive wires 2 are intersected orthogonally, whereby a memory cell is formed by the ferromagnetic film around each of intersection points of the row magnetic wires 3 and the column conductive wires 2. Means 4 which is composed of a small magnet, and the energy of said anisotropy establishes a rest direction in each of the memory cells, arranged in a partial zone of the matrix, in either of two different directions one of which is substantially in parallel with the magnetic wire 3, and the other of which is substantially in parallel with the column conductor 2. These two different directions correspond respectively to binary information to be stored. The partial zones are indicated by dotted line blocks in FIG. 10. In this embodiment, a bit of information is semi-permanently stored in each of the memory cells of a partial zone, and further a bit of information is destructively stored in each of the memory cells of the remaining zones of the matrix when selection is achieved by energizing by an information signal and a drive signal. The information signal is supplied from an information supply 8, through a transformer 9, to at least one of the row magnetic wires 3. The drive signal is supplied from a word drive means 6, through a switching means 7, to one of the column conductive wires 2. When selection is achieved by applying a drive signal of appropriate intensity to at least one selected column conductor to read out the stored information, a bit of stored information is non-destructively read out, from each of the row magnetic wires 3, as an output signal having either of opposite polarities in accordance with the stored binary information of selected memory cell. A direct voltage source 10 and a variable resistance 11 are employed for applying the bias field H*w* to the film of the memory cells. The intensity of the bias field is less than the coercive force of the ferromagnetic film, so that binary information stored in the memory cells of said remaining memory zones can be non-destructively read out unless a large drive signal is applied. As mentioned above, the matrix shown in FIG. 10 is composed of memory cells each corresponding to memory elements described with reference to FIG. 1.

The embodiment shown in FIG. 11 is composed of memory cells each corresponding to memory elements described with reference to FIG. 7. In this embodiment, the easy magnetization direction is established substantially in parallel with the axis of the row magnetic wire 3. The drive signal is applied to the row magnetic wires 3, and the information signal is applied to the column conductor 2. Means 4 of the external magnetic field, such as a small magnet, establishes a rest direction in each of the memory cells, arranged in a partial zone of the matrix, in two opposite directions which are substantially in parallel with the row magnetic wire 3 and correspond respectively to binary information to be stored. The stored information is read out from the column conductors 2. The bias means is omitted. The intensity of the external magnetic field H*o* is greater than the coercive force of the ferromagnetic film. Other features are the same as those of the embodiment shown in FIG. 10. The operation of this embodiment can be easily understood by reference to the description of the operation of the memory element shown in FIG. 7 and of the memory matrix shown in FIG. 10, so that details thereof are herein omitted.

As means 4 for applying the external magnetic field H*o*, the following systems are suitable in practical cases. One example is composed of a plurality of small magnets deposited on a substratum. Another example is composed of a ferromagnetic layer which is uniformly deposited on a substratum, only essential positions of the layer being magnetized in respective necessary directions, while magnetizations of the remaining positions are erased. Still another example is composed of a ferromagnetic film in which a plurality of small rectangular holes are opened at necessary positions, whereby the external magnetic fields are applied by diamagnetic fields produced at respective holes. Moreover, if each of said small magnets or respective portions of the ferromagnetic layer 12 are magnetically connected, as shown in FIG. 12, to the magnetic film 1 by projecting magnetic substances **13*a*, 13*b*, 13*c* . . . and respective loops (indicated by dotted lines) are magnetized in necessary directions, interferences caused by leakage fluxes of adjacent small magnets can be reduced. This form of means 4** is suitable for forming a large capacity matrix memory.

By selecting any pattern of arranged small magnets, semi-permanent magnetic cells can be arranged in any position of memory matrix without changing the remaining structure. Of course, destructive memory cells other than semi-permanent memory cells can be operated without any change.

For the drive signal, a pulse signal or a high frequency signal can be employed for both writing and reading out. When a pulsive drive signal is employed, the output signal is, of course, a pulse signal as shown in FIGS. 6(*a*) and 6(*b*). When a high frequency drive signal is employed, the output signal has a frequency twice that of the drive signal and either of opposite positions according to the stored binary information.

With reference to the arrangement of the magnetic wires and column conductive wires to be used in this invention, the arrangement as disclosed and indicated in the pending U.S. application Nos. 309,469 filed Sept. 17, 1963 and now abandoned and 309,470 filed on Sept. 17, 1963 and now U.S. Pat. No. 3,428,955, may be used.

A practical test of the memory element of this invention was carried out under the following conditions. For the magnetic wire shown in FIG. 10, a beryllium copper wire (0.2 millimetre diameter) electrically plated with Permalloy thin film of 7000A was employed. The easy magnetization axis of the film was in the circumferential direction (for the embodiment shown in FIG. 1) and in axial direction (for the embodiment shown in FIG. 7) of the magnetic wire. The conductive wire was a copper strip which had a width of 1 millimetre and thickness of 0.05 millimetre. The magnitude of the bias current was (15–50) milliamperes. The intensity of the drive pulse was 1 ampere, and the build-up time of the drive pulse was 20 nano-seconds. Under these conditions, an output voltage of ±10 millivolts was induced, in a coil connected with the magnetic wire, in accordance with an external magnetic field $Ho$ of "zero" and "5 Oe." (in the embodiment shown in FIG. 1) and of "±5 Oe." (in the embodiment shown in FIG. 7).

Since it is obvious that many changes and modifications can be made in the above described details without departing from the nature and spirit of the invention, it is to be understood that the invention is not to be limited to the details described herein except as set forth in the appended claims.

What we claim and desire to secure by Letters Patent is:

1. A magnetic semi-permanent memory matrix comprising a set of first conductors arranged in parallel with one another, ferromagnetic film coated on said conductors and having an easy magnetization axis established in the circumferential direction of said conductors, a set of second conductors orthogonally crossing said first conductors and coupled only with said ferromagnetic film, said film at the crossings of said conductors forming memory cells, means for selectively establishing a rest direction of magnetism in selected said memory cells in either of two directions one of which is substantially parallel with said first conductors and the other of which is substantially parallel with said second conductors according to the binary information to be stored, means for applying binary information signals selectively to said first conductors and means for applying drive signals selectively to said second conductors to store bits of information in selected memory cells and for thereafter applying a read-out drive signal of appropriate intensity to at least one selected second conductor to non-destructively read out a bit of store information as an output signal on at least one of said first conductors having either of opposite polarities in accordance with the stored binary information of a selected memory cell.

2. A magnetic semi-permanent memory matrix comprising a set of first conductors arranged in parallel with one another, ferromagnetic film coated on said conductors and having an easy magnetization axis established in the circumferential direction of said conductors, a set of second conductors orthogonally crossing said first conductors and coupled only with said ferromagnetic film, said film at the crossings of said conductors forming memory cells, means for selectively establishing a rest direction of magnetism in selected said memory ceells in either of two opposite directions parallel to said first conductors according to the binary information to be stored, means for applying binary information signals selectively to said second conductors and means for applying drive signals selectively to said first conductors to store bits of information in selected memory cells and for thereafter applying a read-out drive signal of appropriate intensity to at least one selected first conductor to non-destructively read out a bit of stored information as an output signal having either of opposite polarities in accordance with the stored binary information of a selected memory cell.

3. A magnetic semi-permanent memory matrix, comprising a plurality of memory cells of ferromagnetic film arranged into a matrix form, the direction of residual magnetism of the film being established along a predetermined line lying in the film, a set of first conductors arranged in parallel with the predetermined line and coupled with respective rows of memory cells, a set of second conductors arranged orthogonally to the first conductors and coupled with respective columns of memory cells, means for establishing a rest direction of each of the memory cells, arranged in a partial zone of the matrix, in either of two opposite directions which are substantially in parallel with the first conductors and correspond respectively to binary information to be stored, means for applying a binary information signal to at least one of the second conductors, and means for applying a drive signal to at least one of the first conductors, whereby a bit of information is semi-permanently stored in each of the memory cells of the partial zone, and a bit of information is destructively stored in each of the memory cells of remaining zones of the matrix when selection is achieved by energization with the information signal and the drive signal, and a bit of stored information is non-destructively read out, from each of second conductors, as an output signal having either of opposite polarities in accordance with the stored binary information of a selected memory cell when selection is achieved by applying a drive signal of appropriate intensity to at least one selected first conductor.

4. An element according to claim 3, in which the ferromagnetic film has an easy magnetization axis along the predetermined line.

5. An element according to claim 3, in which the ferromagnetic film is isotropic and the direction of residual magnetism of the film is established by a bias field along the predetermined line.

6. An element according to claim 3, in which the ferromagnetic film is coated on a conductor which is employed as the second conductor, the respective memory cells being composed of the films coated around intersections of the first and second conductors.

7. A magnetic semi-permanent memory matrix, comprising a plurality of memory cells of ferromagnetic film arranged into a matrix form, the direction of residual magnetism of the film being established along a predetermined line lying in the film, a set of first conductors arranged in parallel with the predetermined line and couples with respective rows of memory cells, a set of second conductors arranged orthogonally to the first conductors and coupled with respective columns of memory cells, means for estabishing a rest direction of each of the memory cells, arranged in a partial zone of the matrix, in either of two different directions one of which is substantially in parallel with the first conductors and the other of which is substantially in parallel with the second conductors, said two different directions corresponding respectively to binary information to be stored, means for applying a binary information signal to at least one of the second conductors, and means for applying a drive signal to at least one of the first conductors, whereby a bit of information is semi-permanently stored in each of the memory cells of the partial zone and destructively stored in each of the memory cells of remaining zones of the matrix when selection is achieved by energizing with the information signal and the drive signal, and a bit of stored information is non-destructively read out, from at least one selected second conductor, as an output signal having either of opposite polarities in accordance with the stored binary information when selection is achieved by applying a drive signal of appropriate intensity to at least one selected first conductor.

References Cited

UNITED STATES PATENTS

| | | | |
|---|---|---|---|
| 3,370,281 | 2/1968 | Susumu Seki -------- | 340—174 |
| 3,298,005 | 1/1967 | Matick ------------ | 340—174 |

JAMES W. MOFFITT, Primary Examiner